Patented Sept. 29, 1936

2,055,491

UNITED STATES PATENT OFFICE 2,055,491

INSECTICIDE AND GERMICIDE AND PROCESS OF MAKING THE SAME

William H. Hampton, Berkeley, Calif., assignor to Standard Oil Company of California, San Francisco, Calif., a corporation of Delaware No Drawing. Application January 13, 1932, Serial No. 586,463

20 Claims. (Cl. 167—28)

This invention relates to an improved insecticide and germicide capable of being used as an antiseptic, disinfectant or deodorant in general agricultural and domestic use. The invention also relates to a method of manufacturing a product of this character from readily available and novel materials. The products of this invention are particularly adapted for use as fly sprays, animal dips, etc., which are capable of destroying by contact many forms of insect pests, vermin and germ life which annoy humans, cattle, horses, sheep, hogs, dogs and poultry but which are safe to handle and capable of use without injury to man or beast.

Various petroleum oils as well as vegetable oils have been used in insecticidal, fungicidal and similar products but the petroleum oils used heretofore have been employed primarily for their smothering effect. In other words, the petroleum distillates or fractions used in sprays have relied upon their lack of volatility to be of value in the product. The product of this invention, however, employs a modified petroleum fraction or extract which is highly toxic to insect and germ life, which is substantially free from high melting point hydrocarbons and which is highly penetrative in action. A petroleum derivative answering these requirements and embraced by this invention is a sulfur dioxide extract of mineral oils.

It is an object of this invention to disclose and provide a product capable of destroying by contacting, many forms of insect pests, vermin and germ life which annoy humans and animals.

Another object of this invention is to disclose and provide a deodorant and disinfectant for lavatories, camp grounds and the like.

A further object of this invention is to disclose and provide a product capable of being diluted with water, said product being miscible in water so as to form a stable, colloidal suspension and/or solution having toxic properties capable of destroying insects, vermin and germs but being capable of use without injury to man or beast.

A still further object of this invention is to disclose the use of a particular petroleum derivative in an insecticidal and germicidal composition of the character stated, said petroleum derivative being of greater efficacy and capable of operating by a different mode of operation than petroleum factions heretofore employed.

An object of the invention is to disclose and provide a method of making an insecticidal and germicidal preparation in concentrated form, said concentrated preparation being miscible with water so as to readily form dilute compositions suitable for use.

Another object is to disclose and provide a method of using unsaturated or aromatic hydrocarbons and other constituents soluble in liquid sulfur dioxide in germicidal and insecticidal preparations.

These and other objects, uses and advantages of this invention will become apparent to those skilled in the art from the following detailed description of the invention.

As has been stated hereinabove, the various petroleum fractions used heretofore in insecticidal sprays, etc., have been petroleum distillates whereas this invention particularly relates to the use of a petroleum derivative referred to hereinafter as a sulfur dioxide extract. When a petroleum oil or petroleum distillate is treated with liquid sulfur dioxide, the unsaturated or aromatic hydrocarbons dissolve in the liquid sulfur dioxide and may be obtained therefrom in concentrated form by removing the liquid sulfur dioxide with these dissolved constituents from the residual oil and then separating the sulfur dioxide from the constituents which had gone into solution in the sulfur dioxide, by distillation. This liquid sulfur dioxide extract consists essentially of unsaturated or aromatic hydrocarbons and such extracts are extremely toxic to insects, vermin, etc. Sulfur and phenolic compounds are also present in the liquid sulfur dioxide extract and minor quantities, generally less than ½ of 1%, of nitrogen bases are also contained therein. These nitrogen bases are of very little, if any, value and may be removed from the extract when it is desired to separate them for some other purpose. Although the sulphur dioxide extract suitable for use in the products of this invention may be obtained by the treatment of any fraction of petroleum oil with liquid sulfur dioxide, such extract is preferably obtained by the treatment of lighter distillates such as gasoline or kerosene distillates, or intermediate lubricating oil fractions such as mineral seal distillate.

The boiling point range, gravity, etc., of the extract will vary with the character of the oil treated with the sulfur dioxide. The following tabulation gives the properties of a sulfur dioxide extract obtained by the treatment of a kerosene distillate:

|  | Kerosene distillate | $SO_2$ extract |
|---|---|---|
| Gravity | 37.8 | 24.6 |
| Flash | 144 | 167 |
| Sulfur | 0.39 | 1.49 |
| Solubility in 200% of 98% sulfuric acid | 20.55 | 75.00 |

The following tabulation given for comparative purposes, gives certain characteristics of a mineral seal distillate and a sulfur dioxide extract obtained by the treatment of such distillate with liquid sulfur dioxide:

|  | Mineral seal distillate | SO₂ extract |
|---|---|---|
| Gravity | 24.3 | 13.6 |
| Flash | 270 | 270 |
| Viscosity at 100° F | 57 | 65 |
| Sulfur | 0.80 | 1.55 |
| Solubility in 200% of 98% sulfuric acid | 43.20 | 89.32 |

In general, the boiling point range of the extract is somewhat similar to the boiling point range of the distillate from which it was obtained. It has been found that a sulfur dioxide extract having a boiling point range of between about 350° F. and 550° F. is very satisfactory for the purposes of this invention.

As has been stated hereinbefore, extracts obtained by the treatment of the lighter and more penetrating distillates are more desirable than extracts obtained by the treatment of heavier fractions such as the heavier lubricating oils but such heavier extracts can also be used in the preparation of insecticidal and germicidal products for certain purposes.

The sulfur dioxide extracts used in the products of this invention are more highly unsaturated than are natural distillates. The unsaturated constituents are apparently quite toxic and as they are obtained in the extract in concentrated and unchanged form, the product produced therefrom is extremely efficient as an insecticide and germicide.

As a direct measure of the difference in toxicity between a kerosene distillate and the sulfur dioxide extract obtained from this distillate, tests were made by spraying flies in cages with a kerosene distillate and with a product made from the sulfur dioxide extract obtained from such distillate. Ninety per cent of the flies sprayed with the extract preparation were down in seven minutes whereas it took from one to two hours to bring down the flies with the straight distillate. Furthermore, ninety-four per cent of the flies sprayed with the extract were dead after two and one half hours whereas after twenty-four hours only about sixty per cent of the flies remaining in the cages sprayed with the distillate were dead.

Furthermore, the sulfur dioxide extracts distinguish from other materials and petroleum derivatives in that they do not contain the tar acids peculiar to coal tar distillates, nor do they contain such compounds as naphthalene, anthracene and other relatively high melting point hydrocarbons. The sulfur dioxide extracts contain appreciable amounts of petroleum or naphthenic acids but substantially no acids of a phenolic type common to coal tar.

A substantial portion of these petroleum oil products consist of complex sulfur and nitrogen bodies differing from the thiophene and the pyridine type of compounds found in coal tar. The sulfur dioxide extract, furthermore, contains unsaturated and aromatic compounds which render it fluid at very low temperatures whereas coal tar distillates of similar boiling point range are solid at much higher temperatures because of the relatively high proportion of solid hydrocarbons. This property of fluidity at relatively low temperatures, characterizing the sulfur dioxide extract, is very desirable because it permits the extract to readily penetrate to all sources of infestation. Moreover, the sulfur dioxide extract has much less odor than coal tar fractions.

In manufacturing the insecticidal and germicidal product of this invention, a sulfur dioxide extract, preferably obtained from a petroleum fraction rich in unsaturated or aromatic hydrocarbons and of a suitable viscosity, such as for instance an extract obtained from a kerosene distillate from California crude oils, is mixed with a suitable alkali soap and a fluxing agent. When it is desired to prepare a concentrated or base product capable of being subsequently diluted with water so as to form a spray of any desired concentration, the ingredients are so proportioned that the base product contains from about 75% to 85% of sulfur dioxide extract.

By a "fluxing agent", reference is made to a material which will keep the soap in solution in the extract. Alcohol, animal fats or cresylic acid are examples of suitable fluxing agents. The soap is preferably an alkali soap although any soap capable of going into solution in the extract may be employed. The soap may be made directly in the sulfur dioxide extract by mixing a suitable fatty acid, saponifiable oil, fat or glyceride, together with caustic soda or potash or other alkaline solution with the extract; or instead, the soap and fluxing agent may be separately mixed and then added to the sulfur dioxide extract in proper proportions. It has been found that cresylic acid is a particularly efficacious fluxing agent because of its cheapness and very strong germicidal properties.

Illustrative of the compositions embraced by this invention, it has been found that the following ingredients may be utilized in the proportions stated to produce suitable products:

|  | Per cent by volume |
|---|---|
| Sulfur dioxide extract | 75 to 85 |
| Commercial oleic acid (red oil) | 3 to 12 |
| Caustic potash (about 48° Bé.) | 1 to 4 |
| Cresylic acid | 5 to 15 |

A specific composition which has been found to be particularly efficacious contained 80.75% by volume of sulfur dioxide extract obtained from a kerosene distillate, 6.5% of oleic acid, 1.75% of a 48° Bé. caustic potash solution, and 11% of cresylic acid.

The base preparations of the character stated hereinabove are solutions which are readily miscible or emulsifiable with water. In other words, the base products may be mixed with water in all proportions so as to form therewith finely dispersed milky emulsions which remain stable on standing. The base preparations may be used in concentrated form for the treatment of certain animal diseases. For general use, however, a base preparation of this kind is first mixed with an equal quantity of water and then diluted with additional water varying down to one part of emulsion to twenty parts of water. Such diluted insecticides and germicides may be employed as an animal dip, as a spray, as a constituent of scrubbing water, or as a surface application for local infections.

The base products of this invention should not contain less than about 15% of the emulsifying agents, namely, soap and fluxing agent. The proportion of extract can, of course, be greatly decreased without affecting the stability of the emulsion. It is advisable, however, to maintain the proportion of extract as high as possible, namely, between about 75% and 85% by volume of the base product. The relative proportion of cresylic acid to soap can be varied quite materially without substantially changing the product, although the general range indicated appears to cover the relatively adaptable variations in proportion.

While particular ingredients and proportions have been specified for the preferred embodiment of the invention, it is to be understood that the invention is not limited thereto but embraces all such changes and modifications as come within the scope of the following claims.

I claim:

1. A new insecticidal and/or insect-repelling composition of matter containing as its active ingredient a substantial quantity of Edeleanu extract.

2. A new insecticidal and/or insect-repelling composition of matter containing as its active ingredient a substantial quantity of Edeleanu extract derived from a kerosene distillate.

3. A new insecticidal aqueous emulsion containing as its active ingredient at least 60% Edeleanu extract.

4. A new insect-repelling aqueous emulsion containing as its active ingredient at least 25% Edeleanu extract.

5. A new insecticidal, germicidal and/or insect-repelling composition of matter containing as an active hydrocarbon ingredient, aromatic and unsaturated petroleum constituents soluble in liquid sulfur dioxide.

6. A new composition of matter adapted for use as an insecticide or germicide, containing as an active petroleum ingredient, a substantial quantity of neutral petroleum constituents soluble in liquid sulfur dioxide.

7. A new insecticidal, germicidal and/or insect-repelling composition of matter containing as an active hydrocarbon ingredient, aromatic and unsaturated petroleum constituents soluble in liquid sulfur dioxide and derived from a kerosene distillate.

8. A new composition of matter adapted for use as an insecticide or germicide, said composition being emulsifiable with water, the major proportion of said composition comprising aromatic and unsaturated petroleum constituents soluble in liquid sulfur dioxide combined with an alkali soap and a fluxing agent.

9. An insecticidal and germicidal base product, said product being emulsifiable with water, and containing from about 75% to 85% by volume of petroleum constituents soluble in liquid sulfur dioxide, said constituents being composed essentially of unsaturated and aromatic hydrocarbons, in combination with a soap and a disinfectant.

10. An insecticidal and germicidal base product, said product being emulsifiable with water, and containing from about 75% to 85% by volume of petroleum constituents soluble in liquid sulfur dioxide, said constituents being composed essentially of unsaturated and aromatic hydrocarbons, in combination with an alkali soap and cresylic acid.

11. An insecticidal and germicidal product of the character described, capable of being diluted and emulsified with water, and containing a sulfur dioxide extract of petroleum oil, said extract having a boiling point range of between 350° F. and 550° F.

12. An insecticidal and germicidal product of the character described, capable of being diluted and emulsified with water, and containing a sulfur dioxide extract of unrefined petroleum oil, an alkali soap and a fluxing agent, said extract having a boiling point range of between 350° F. and 550° F.

13. An insecticidal and germicidal product of the character described, capable of being diluted and emulsified with water, and containing petroleum constituents soluble in sulfur dioxide, an alkali soap and cresylic acid, said extract having a boiling point range of between 350° F. and 550° F.

14. An insecticidal and germicidal base product, capable of being diluted and emulsified with water, and consisting of between about 75% and 85% by volume of aromatic and unsaturated constituents derived from petroleum oil and soluble in liquid sulfur dioxide, 3% to 12% by volume of oleic acid, 1% to 4% by volume of concentrated caustic solution, and 5% to 15% by volume of cresylic acid.

15. An insecticidal and germicidal product comprising, an emulsifiable compound of constituents of petroleum oil soluble in liquid sulfur dioxide, fatty acid and caustic solution.

16. An insecticidal and germicidal product comprising, an emulsifiable compound of constituents of petroleum oil soluble in liquid sulfur dioxide, fatty acid, caustic solution and cresylic acid.

17. A process of manufacturing an insecticide and germicide capable of being diluted and emulsified with water comprising, adding saponifiable material to a sulfur dioxide extract of a petroleum oil, adding a caustic solution to said extract to saponify the acids present, and agitating the mixture to produce a compound emulsifiable with water.

18. A process of manufacturing an insecticidal and germicidal compound capable of being diluted and emulsified with water comprising, adding a saponifiable oil to a sulfur dioxide extract of a petroleum distillate, mixing caustic solution with said extract in quantity sufficient to saponify the oil, and then adding cresylic acid to the mixture.

19. A method of controlling insectary pests, vermin and germs, which comprises: contacting insectary pests, vermin and germs with a composition containing, as active hydrocarbon ingredient, aromatic and unsaturated petroleum constituents soluble in liquid sulfur dioxide.

20. A method of controlling insectary pests, vermin and germs, which comprises: contacting insectary pests, vermin and germs with an aqueous dispersion containing, as active hydrocarbon ingredient, aromatic and unsaturated petroleum constituents soluble in liquid sulfur dioxide.

WILLIAM H. HAMPTON.